UNITED STATES PATENT OFFICE.

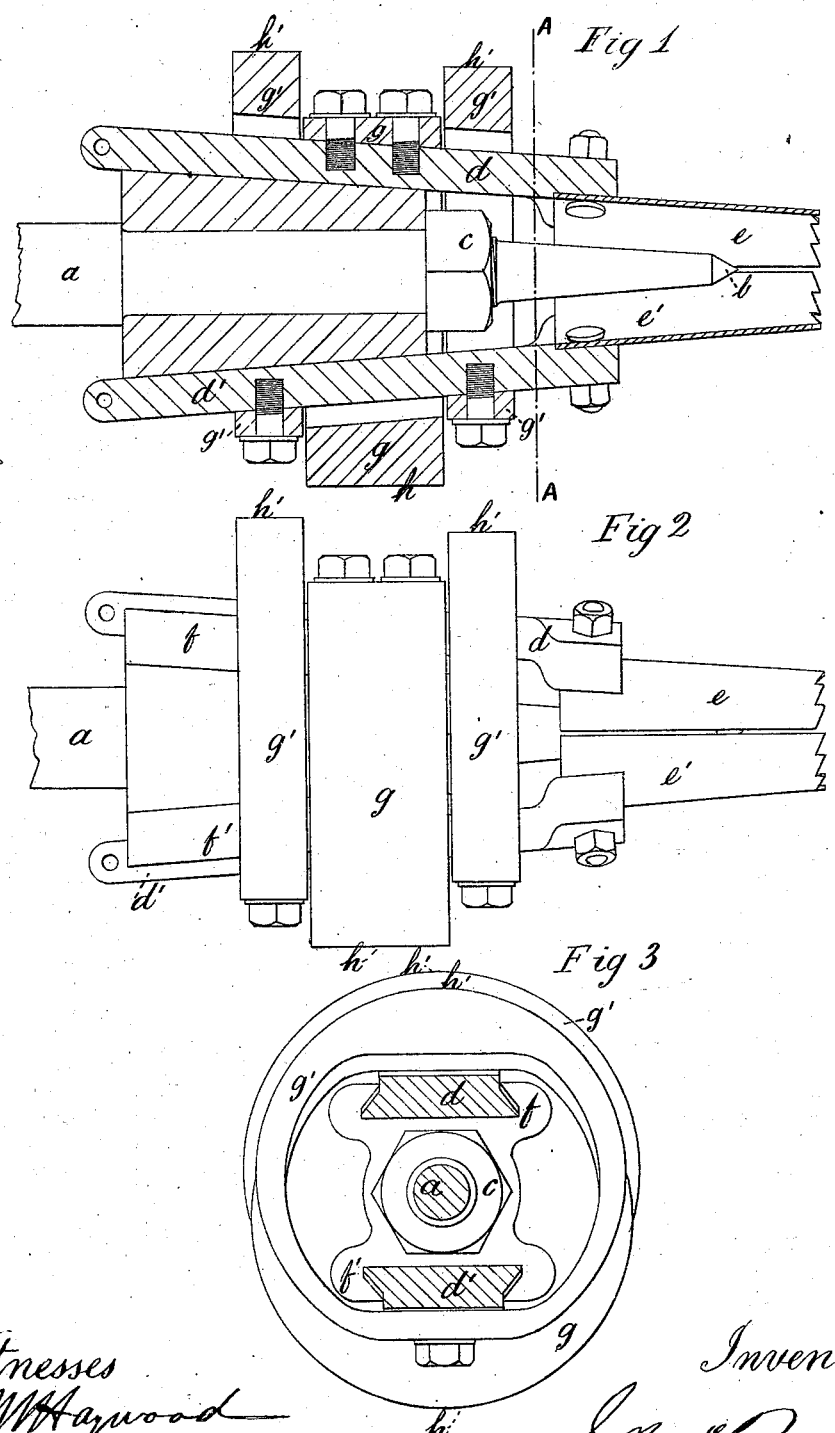

EDWARD RAYNER, OF LIVERPOOL, ENGLAND.

IMPROVEMENT IN MACHINES FOR CUTTING BUNGS.

Specification forming part of Letters Patent No. 149,788, dated April 14, 1874; application filed March 27, 1874.

*To all whom it may concern:*

Be it known that I, EDWARD RAYNER, of Liverpool, in the county of Lancaster, England, have invented an Improved Chuck for Cutting Bungs, and like taper articles, of which the following is a specification:

Hitherto the attempt to cut bungs and like taper articles from strips of wood, by means of a rotating chuck provided with cutters secured to sliding bars, has been attended with failure, principally on account of excessive friction between the sliding bars and their guides. The said excessive friction results from centrifugal force, engendered by the necessarily rapid rotation of the chuck when at work, forcing the sliding bars against the outside bearing-surfaces of the guides with considerable pressure.

Now, the object of this invention is to obviate the said excessive friction between the sliding bars and their guides, and is accomplished in manner following: Each of the said sliding bars has attached thereto a weight or weights, placed and adjusted in such manner that centrifugal force tending to move the sliding bar in one direction is neutralized by centrifugal force tending to move the weight or weights in the opposite direction; or, in other words, each sliding bar and weight is so arranged that their center of gravity as a whole coincides with the center of rotation of the chuck.

The appended sheet of drawings contains three views illustrative of my invention.

Figure 1 is a longitudinal section; Fig. 2, a side elevation, and Fig. 3 a transverse section, at the line A A.

All of my improved chuck constructed in the manner which I prefer.

In these views like letters denote the same parts.

$a$ is a rotating spindle with center $b$ to hold the bung while being cut. The chuck rotates with the spindle $a$, and is secured thereto by the nut $c$. $d$ $d'$ are bars, having secured thereto the saw-cutters $e$ $e'$; the said bars slide in guides $f$ $f'$ in the chuck. $g$ $g'$ are rings secured to the bars $d$ $d'$, and passing freely round the chuck. The said rings are so thick and heavy at $h$ $h'$ that the center of gravity of each ring, sliding bar, and cutter combined coincides with the center of motion of the spindle and chuck.

It will be obvious that curved bars passing half round the chuck, and weighted at their free ends, or weighted bars passing through the chuck, might be used instead of the rings above described.

The mechanism for actuating the rotating spindle, and for giving to-and-fro motion to the sliding bars so as to cause them to enter and leave the wood from which the bung or like taper article is being cut, may be of any ordinary or desired kind, and forms no part of my invention.

Having now described the nature of my said invention, and particularized the same in such a manner that others will be enabled to carry my improvements into effect, I claim—

The combination with the weights $g$ $g'$ of the sliding bars $d$ $d'$, and cutters $e$ $e'$, operating substantially in the manner and for the purposes set forth.

EDW. RAYNER.

Witnesses:
W. W. HAYWOOD,
JAS. JOHNSON.